United States Patent [19]

Carlsson

[11] 4,362,219

[45] Dec. 7, 1982

[54] FOOD PREPARING MACHINE

[75] Inventor: Karl L. Carlsson, Atvidaberg, Sweden

[73] Assignee: Aktiebolaget Electrolux, Stockholm, Sweden

[21] Appl. No.: 250,210

[22] Filed: Apr. 2, 1981

[30] Foreign Application Priority Data

Apr. 3, 1980 [SE] Sweden ............................... 8003580

[51] Int. Cl.³ .......................................... G01G 19/52
[52] U.S. Cl. ............................. 177/245; 177/DIG. 6; 177/126; 241/101.3; 366/141
[58] Field of Search ................... 177/245, 25, DIG. 6, 177/126, 144, DIG. 3, 132; 366/141, 349; 241/101.3

[56] References Cited

U.S. PATENT DOCUMENTS

| 2,691,997 | 10/1954 | Matarrese | 177/132 X |
| 3,171,636 | 3/1965 | Barlow | 366/141 |
| 3,967,271 | 6/1976 | Day | 177/DIG. 6 |
| 4,072,201 | 2/1978 | Wiesler | 177/DIG. 6 |

Primary Examiner—Joseph W. Hartary
Attorney, Agent, or Firm—Alfred E. Miller

[57] ABSTRACT

A food preparing machine has an electric motor for driving food processing implements in order to eliminate the need for a separate weighing unit or for a volume-measuring unit when measuring different ingredients, the machine is provided with a weight-measuring device which is connected by way of an electric circuit in the machine to a display on the casing of the machine, for showing the weight of the ingredients.

8 Claims, 6 Drawing Figures

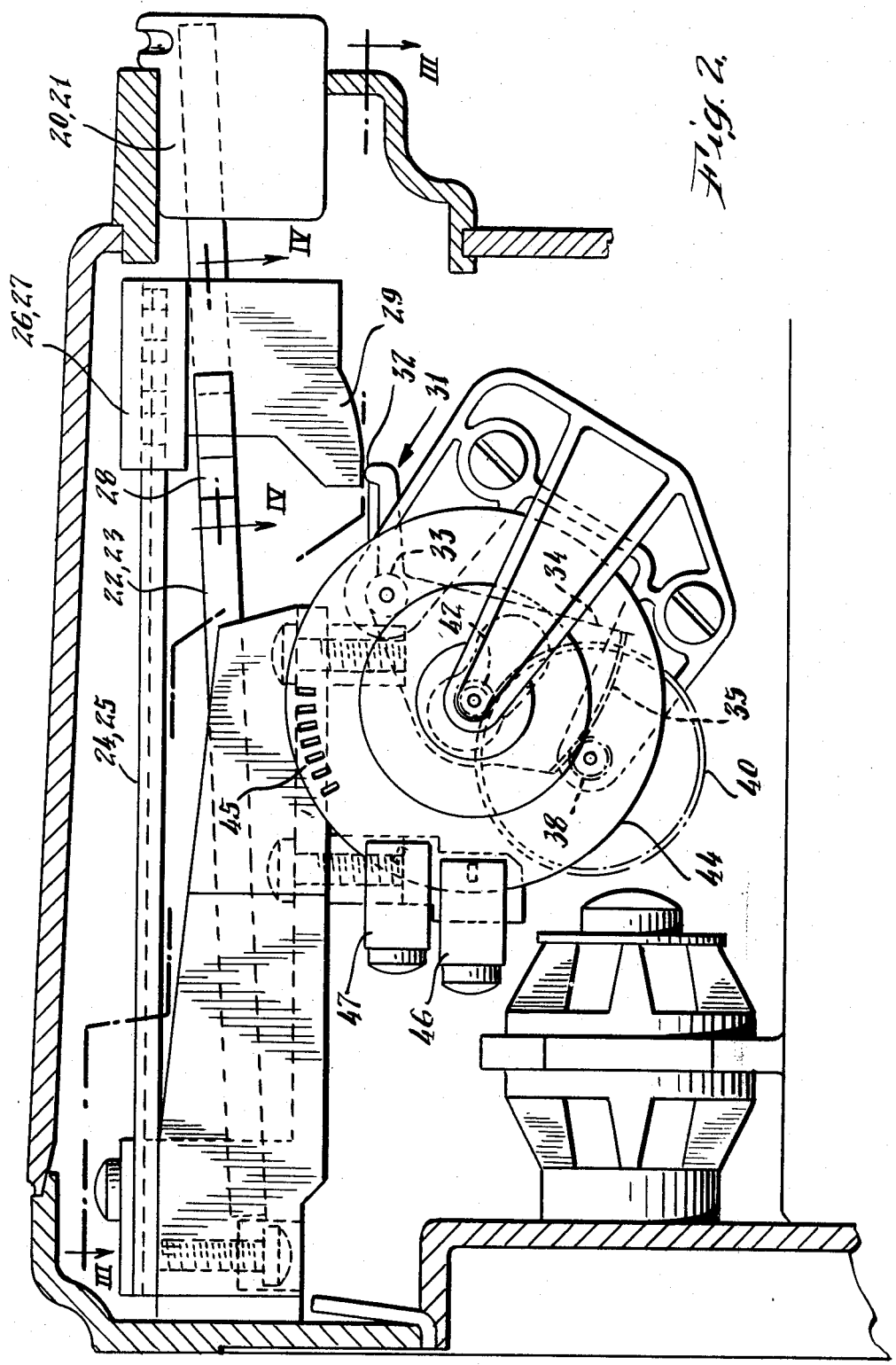

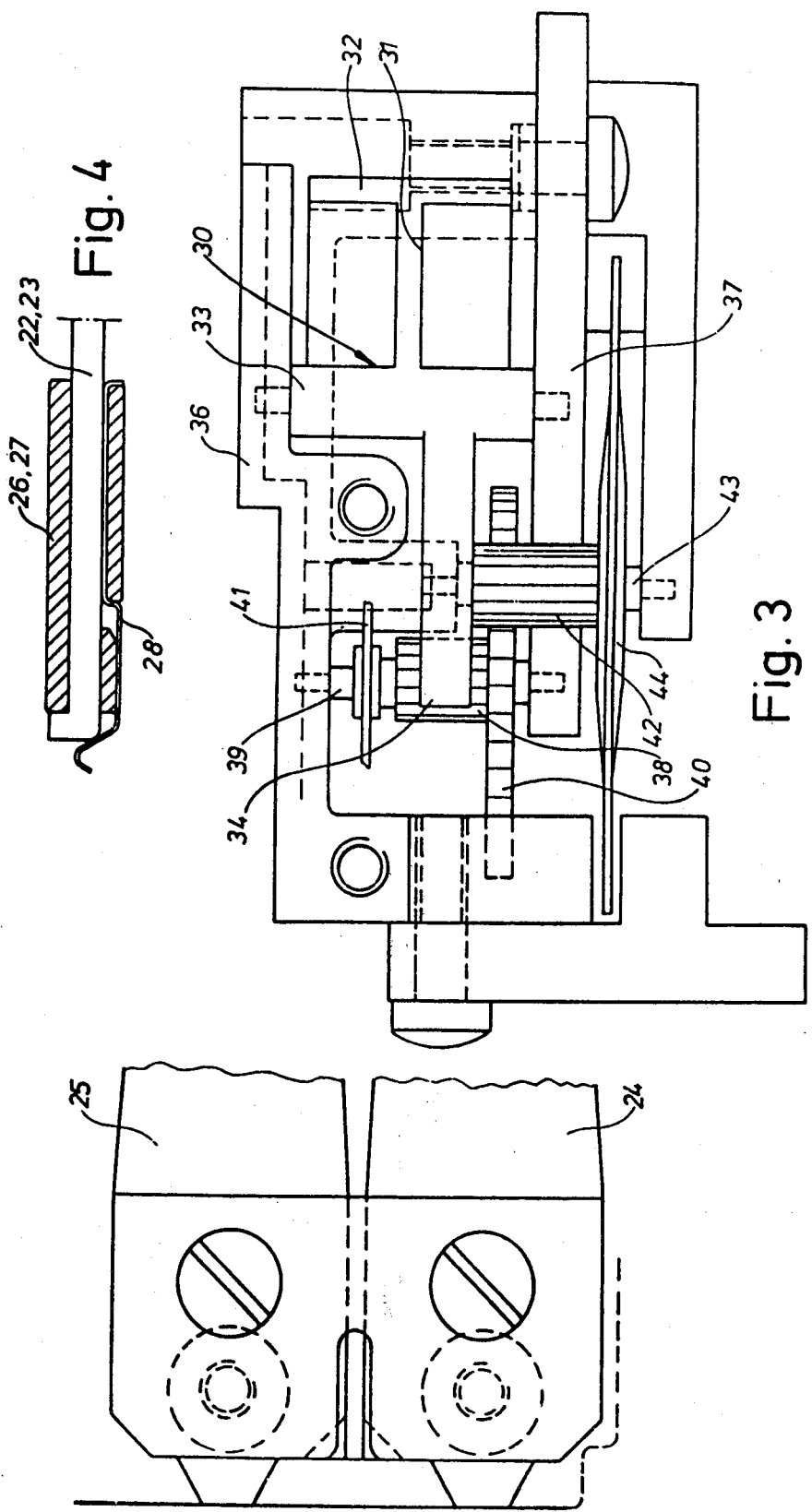

FOOD PREPARING MACHINE

This invention relates to a food preparing machine.

Machines of the above-mentioned type are well known and are used for such household work as mixing dough, beating the mixing different ingredients, and for mincing and cutting different types of foodstuff.

Since it is often necessary in this type of work to measure the ingredients in given proportions, it has previously been common to use separate weight-measuring devices or volume-measuring devices having given volume-weight relations for measuring the different ingredients. The use of a separate weight-measuring device is inconvenient and space-consuming. The use of volume-weight relations in turn involves a comparatively great risk of conversion errors, which could result in too much or too little of some ingredient being mixed into the food being prepared.

The object of this invention is to eliminate these disadvantages and to provide a food preparing machine which is better suited for household work than the previously known machines.

In order that the invention will be more clearly understood, it will now be disclosed in greater detail with reference to the drawings, wherein:

FIG. 2 is an enlarged vertical section of a portion of the machine of FIG. 1;

FIG. 3 is a section taken along the lines III—III of FIG. 2;

FIG. 4 is a section taken along the plane IV—IV of FIG. 2; and

Figure 1:
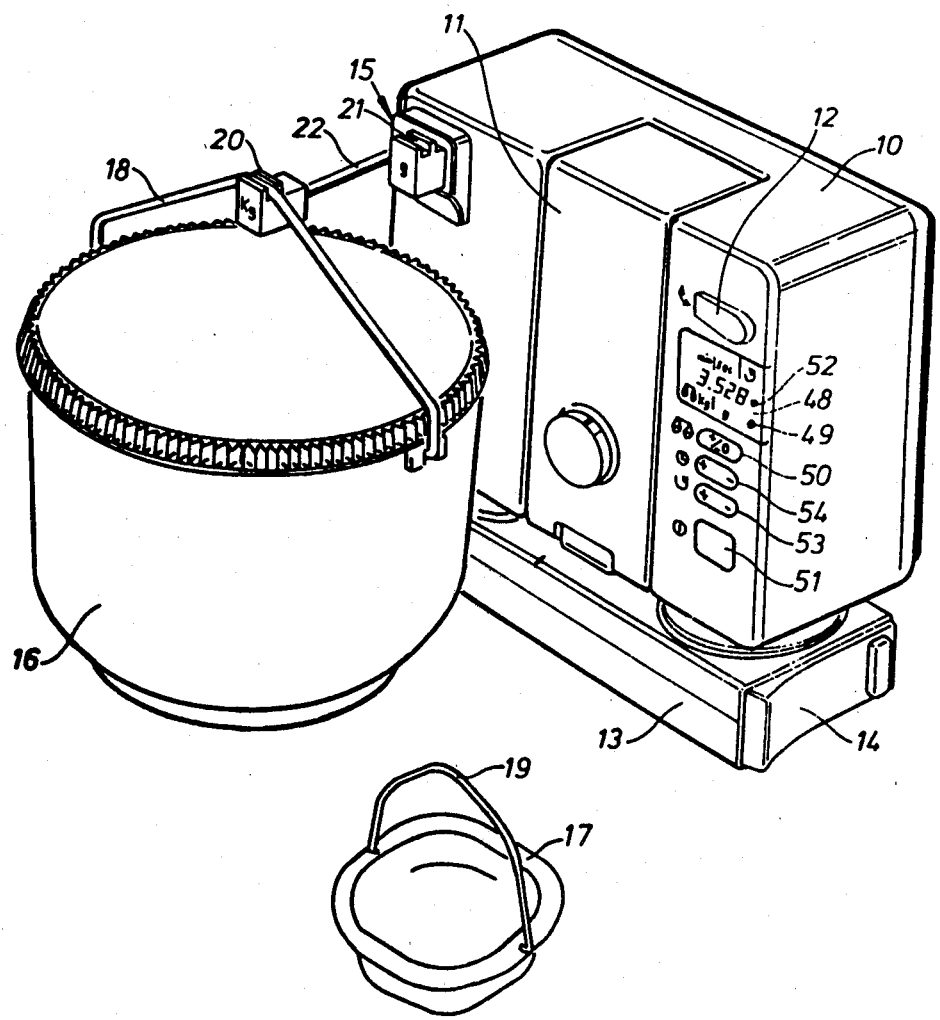
FIG. 1 is a perspective view of a food preparing machine in accordance with the invention.

The food preparing machine shown in FIG. 1 comprises a casing 10 enclosing an electric motor (not shown). The casing includes a mounting plate adapted to be hung on a wall above a kitchen tabletop surface or the like. The mounting plate supports an upper arm 11 which, when a button 12 is depressed, by the action of a spring is swung out to an outer position about a horizontal axis in the upper part of the machine. A lower arm 13 is also provided which, by activating a button 14, is swingable about a vertical axis in the left-hand part of the machine to an outer position. The lower arm 13 can be turned to a position in which its outer part is directly under the upper arm 11 or to a position in which it projects at right angles to the machine. The two arms are provided with power connectors for implements such as beaters, kneading devices, mixers or the like. The lower arm can also support a bowl so that the implement connected to the upper arm can process material in the bowl. This portion of the machine illustrated in the Figures is described in more detail in Swedish Pat. No. 7702448-7.

In this upper left-hand corner, the machine is provided with a weight-measuring device 15 to which one or several scale pans can be fastened. Preferably a large scale pan 16, for instance the bowl which normally is a part of the machine, is used for a large quantity of ingredients, for instance 5 hg–5 kg, whereas a smaller scale pan 17 is used for weights up to about 5 kg.

The two scale pans are provided with loops 18 and 19, respectively, which can be placed in either of two sockets 20 and 21, respectively. These sockets are the outer parts of two arms 22, 23, each slidably supported by a plate spring 24, 25 (FIG. 2). The plate springs extend from the rear part of the casing, where they are fastened by means of screws or the like, to the front part of the machine. The plate springs have different spring characteristics, the spring 24 supporting the socket for the biggest scale pan being stiffer than the other spring 25.

Each plate spring 24, 25 supports a holder 26, 27 at its front end, in which the arms 22 and 23 are slidably secured. The arms can be moved between a position in which they are completely extended to a position in which they are completely enclosed in the casing. In the extended position the arms are locked by a spring 28, whereas in the enclosed position the arms operate a microswitch, not shown, in the rear part of the machine.

The lower part of each holder 26, 27 is provided with a cam-shaped part 29, which cooperates with a toothed segment 30. This segment comprises a tilting lever 31 which at its outer end has a shoulder 32 at its outer end. The shoulder is acted on by the cam-shaped part 29 of each holder 26, 27, as well as a shaft 33 connected to a segment part 34. The outer end of the segment part 34 is curved and provided with several teeth 35. The shaft 23 is journalled in two supports 36, 37 and can be turned through 30°. The teeth 35 are in engagement with a small gear wheel 38 which, by means of a shaft 39, is rigidly secured to a bigger gear wheel 40 so that a step-up movement is achieved. The shaft 39 is turnable in the support 36, 37. The shaft is connected to a helical spring 41 of fly type which strives to turn the gears clockwise in FIG. 2. The gear wheel 40 is in engagement with another gear wheel 42 which is rigidly secured to a shaft 43 and merges into a code plate 44. The shaft 43 is journalled between the supports 36 ad 37. The code plate 44 is provided near its periphery with several holes 45 which, during the turning movement of the plate, pass two indicators 46 and 47, respectively. Such indicators are previously known, each comprising a light-emitting diode and a photo transistor for counting pulses generated as the holes 45 in the code plate 44 are detected during the turning movement of the latter. The pulses are transformed by conventional electric means into signals on a display 48 (see FIG. 1).

To operate the weight-measuring device, first either of the arms 22 or 23 is extended and a scale pan is mounted on the socket. The lighting of a light-emitting diode in the display indicates that the machine is ready for weighing and the right scale interval is automatically chosen.

The weight-measuring unit is started by a button 50. If both arms are drawn out, this is indicated to be unallowable by intermittent lighting of the light-emitting diode. When the ingredients are placed on the scale pan the plate spring will bend downwards in proportion to the weight. This means that the toothed segment 30 turns about its shaft 33 and the teeth 35 move the gears 38 and 40 counter-clockwise in FIG. 2 against the action of the helical spring 41. Thus, the code plate 44 is turned clock-wise. When the holes 45 pass the indicators pulses are initiated in the electric circuit and these pulses are transformed in known manner into signals on the display 48, the signals corresponding to the downwards movement of the scale pan.

The display is also used to set the motor speed and for the time control function of the machine. Thus, the motor is switched on by a button 51 which is indicated by lighting up a light-emitting diode 52. The speed of the motor thereby is set automatically on level four of nine possible different speed levels. This position in indicated by figures to the right in the display. In order to increase or decrease the speed a button 53 is depressed whereby a new higher or lower speed level is chosen and is indicated in the same part of the display. The motor is switched off by depression of the button 51 another time thereby turning the light-emitting diode off.

The motor drive is combined with an electronic time control system, which can be used when the motor is to be activated for the processing of the ingredients. The function is initiated by activating a button 54 whereby the three remaining figures on the display light up and indicate the time in minutes and seconds. During depression of the button the figures are stepped up in accelerating speed up to maximum 9 minutes and 59 seconds. The chosen time can, if desired, be stepped backwards by using the same button. When the desired running time for the machine has been set, the motor is started whereupon the display continuously shows the remaining running time.

Figure 5A:
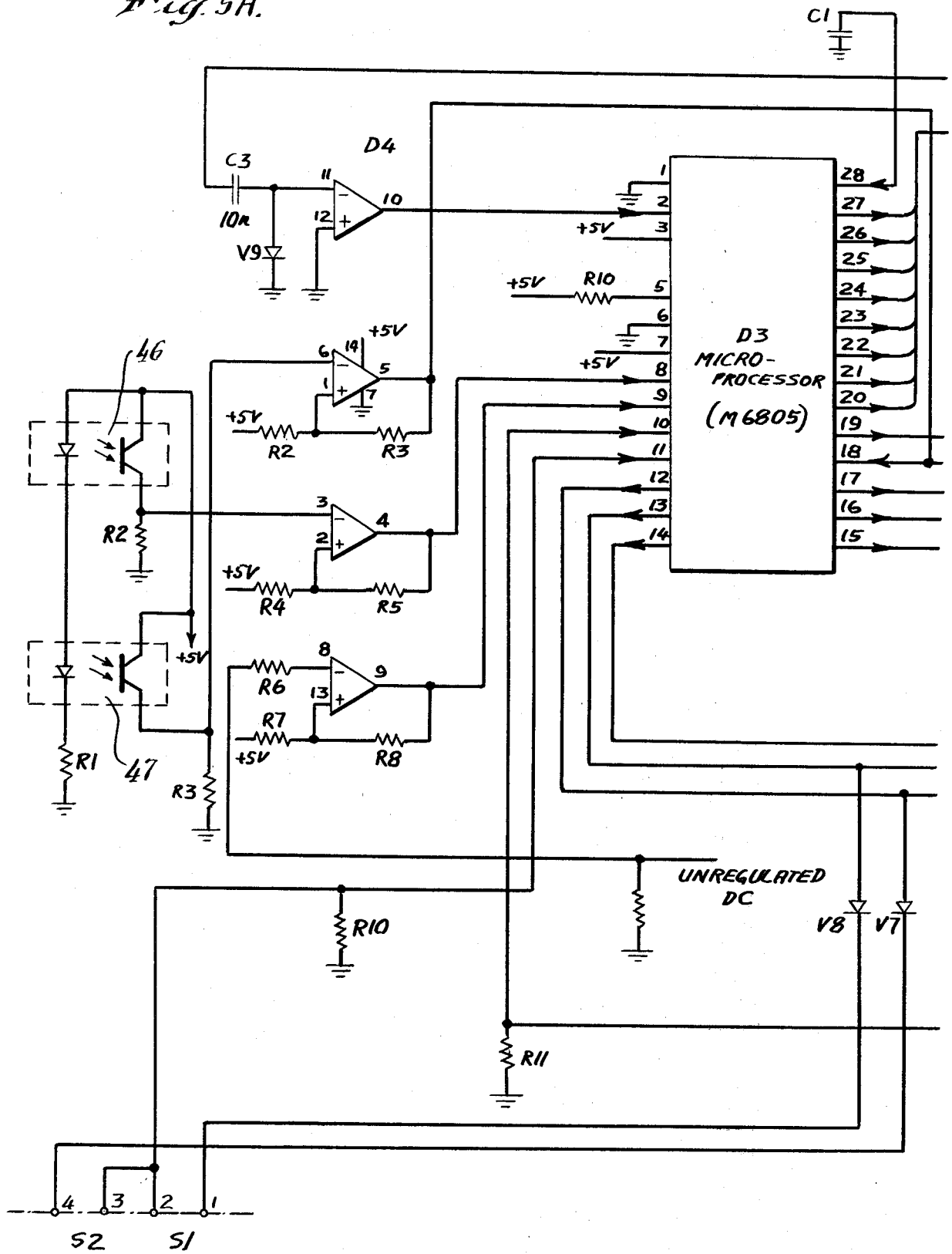
FIGS. 5A and FIG. 5B is a simplied schematic of the electrical system of the invention.
Figure 5B:
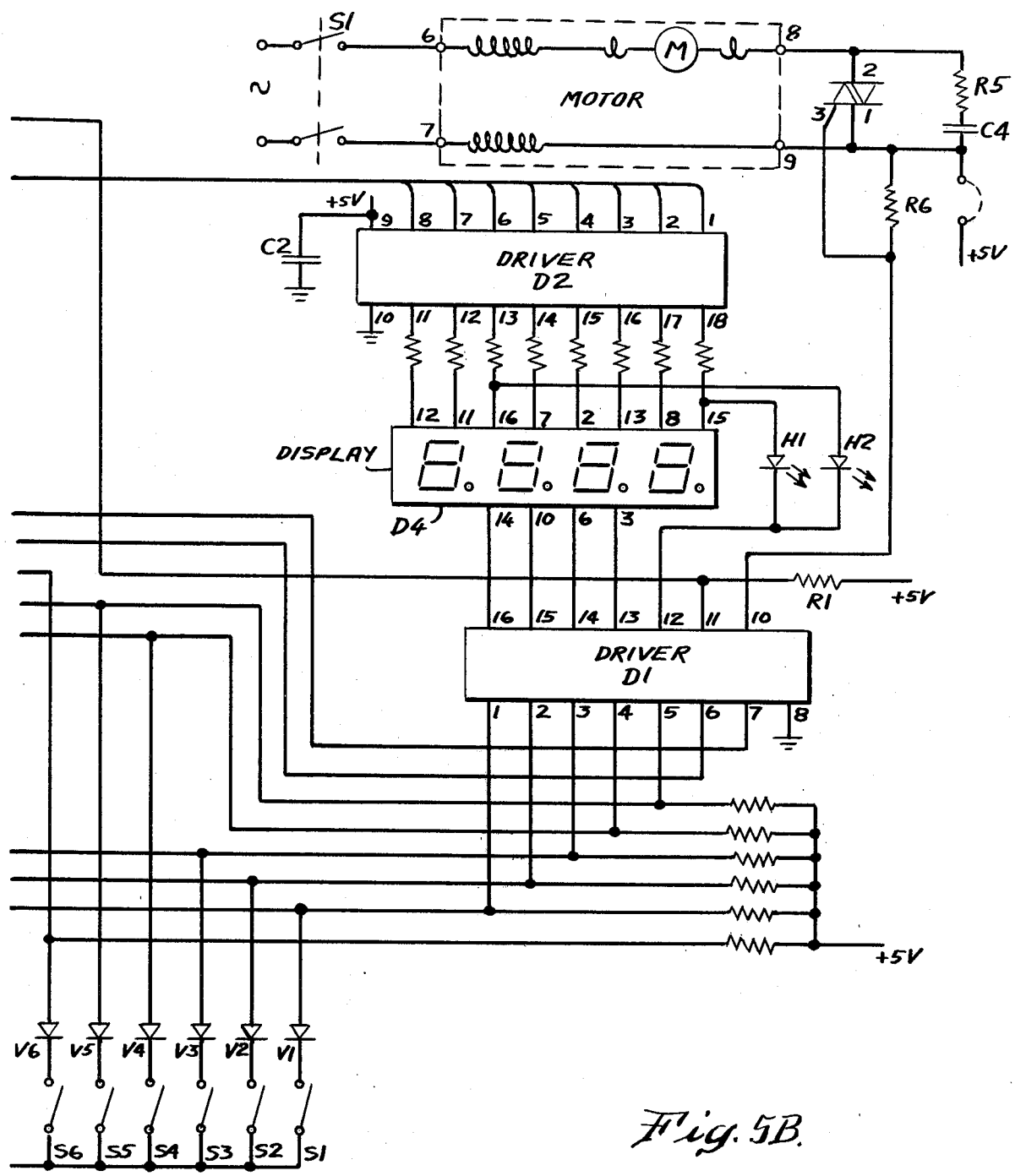

The system for operating the system of the invention is illustrated generally in FIGS. 5A and 5B, wherein it is seen that the system is operated under the control of a micro processor D3, such as a type M6805. The operating switches S are coupled to the micro processor, by way of diodes V1–V8. The micro processor controls the display D4, for example by way of conventional segment and digit drivers D2 and D1, respectively. These drivers also control the leds H1 and H2, indicating various parameters as above discussed in the operation of the appliance. The process switches comprise optical sensors 46 and 47, and are coupled to selected inputs of the micro processor, as illustrated. In this instance, the switches S1 and S2 may constitute the microswitches which detect the enclosed positions of the measuring arms.

The micro processor is programmed in conventional manner, to effect the above functions. It will be apparent, however, that, although a micro processor control is preferred, any conventional display system may be incorporated for displaying the weights, in accordance with the invention.

While the invention has been disclosed and described with reference to a single embodiment, it will be apparent that variations and modifications may be made therein, and it is not intended the following claims to cover each such variation and modification as falls within the true spirit and scope of the invention.

What is claimed is:

1. In a food processing machine having a casing enclosing an electric motor adapted to drive one or more detachable food processing implements, the improvement wherein said machine further comprises a weight-measuring device, said weight-measuring device comprising a separable scale pan, and a weighing element extending within said casing, said weighing element having a portion for receiving said scale pan external of said casing, said weighing element being downwardly bendable under weight in said pan, said weight measuring device further comprising a display, and mechanical-electrical transducing means for converting bending movement of said weighing element to electric signals for said display.

2. The machine of claim 1 wherein said weighing element comprises a holder, and an arm is slidably mounted in said holder, said arm having a socket for receiving said pan.

3. The machine of claim 2 wherein said mechanical electrical transducing means comprises a code plate having a plurality of holes, gear means for moving said code plate in response to bending of said weighing element, and sensing means positioned adjacent said code plate for generating pulses as said holes pass thereby.

4. The machine of claim 3 wherein said gear comprises a toothed segment which turns at least one other gear in dependence upon the downward bending movement of said weighing element, which other gear in turn transmits the movement to said code plate.

5. The machine of claim 1 further comprising a second weight-measuring means including a second weighing element extending within said casing and having a portion for receiving a scale pan, said weighing element being downwardly bendable, and further comprising mechanical electrical transducing means for converting displacement of said second weighing element to electric signals for said display.

6. The machine of claim 1 wherein said weighing element comprises an elongated spring having a rear end affixed at the rear of said casing, said spring extending forwardly and having a holder on its forward end, bar means slidably mounted in said holder and movable to be substantially within said casing in one position and having a substantial portion thereof outside of said casing in a second position, said holder having receiving means on its forward end for receiving said pan, whereby weight on said pan effects the downward movement of the forward end of said spring.

7. The machine of claim 6 further comprising switch means within said casing for detecting the rearmost position of said bar.

8. The machine of claim 1 further comprising micro processor control means coupled to control said display in response to the positioning of said weighing element, and for controlling said display means in response to operation of the food processing portion of said machine wherein said weight-measuring device is not in operation.

* * * * *

UNITED STATES PATENT OFFICE
CERTIFICATE OF CORRECTION

Patent No. 4,362,219                    Dated December 7, 1982

Inventor(s) KARL L. CARLSSON

It is certified that error appears in the above-identified patent and that said Letters Patent are hereby corrected as shown below:

[30] Foreign Application Priority Data

April 3, 1980 [SE] Sweden "8003580" should be

--8002580--.

Signed and Sealed this

First Day of February 1983

[SEAL]

Attest:

GERALD J. MOSSINGHOFF

Attesting Officer    Commissioner of Patents and Trademarks